United States Patent
Butler (10) Patent No.: US 10,143,028 B1
(45) Date of Patent: Nov. 27, 2018

(54) WIRELESS COMMUNICATION SYSTEM TO IMPLEMENT INDEPENDENT WIRELESS CONNECTIONS

(71) Applicant: Sprint Communications Company L.P., Overland Park, KS (US)

(72) Inventor: Robert Keith Butler, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 108 days.

(21) Appl. No.: 15/363,117

(22) Filed: Nov. 29, 2016

(51) Int. Cl.
| | |
|---|---|
| H04W 76/15 | (2018.01) |
| H04W 88/08 | (2009.01) |
| H04W 88/02 | (2009.01) |
| H04W 48/18 | (2009.01) |
| H04W 40/12 | (2009.01) |
| H04W 36/30 | (2009.01) |
| H04W 28/02 | (2009.01) |
| H04W 8/30 | (2009.01) |
| H04L 12/24 | (2006.01) |
| H04B 17/40 | (2015.01) |

(Continued)

(52) U.S. Cl.
CPC .............. H04W 76/15 (2018.02); H04B 7/14 (2013.01); H04B 17/40 (2015.01); H04L 41/0803 (2013.01); H04W 8/30 (2013.01); H04W 24/04 (2013.01); H04W 28/0236 (2013.01); H04W 36/30 (2013.01); H04W 40/12 (2013.01); H04W 48/18 (2013.01); H04W 88/02 (2013.01); H04W 88/08 (2013.01)

(58) Field of Classification Search
CPC ...... H04B 7/022–7/026; H04B 7/14–7/15592; H04B 17/0082–17/409; H04L 2001/0097; H04L 5/003–5/0035; H04L 5/0091–5/0098; H04L 41/0803; H04W 8/30; H04W 16/02–16/12; H04W 24/02–24/10; H04W 28/02–28/26; H04W 36/0005–36/385; H04W 40/005–40/38; H04W 48/02–48/20; H04W 72/12–72/14; H04W 76/10–76/40; H04W 84/18–84/22; H04W 88/02; H04W 88/08; H04W 88/12; H04W 92/12; H04W 92/20; H04W 92/22
See application file for complete search history.

(56) References Cited

U.S. PATENT DOCUMENTS

7,558,193 B2   7/2009  Bradbury et al.
7,848,268 B2   12/2010 Boyina et al.
(Continued)

Primary Examiner — Timothy J Weidner (57) ABSTRACT

A wireless communication system implements independent wireless connections for a data communication service. Multiple wireless communication devices establish the independent wireless connections with multiple wireless access points, and responsively monitor the independent wireless connections. The wireless communication devices receive a request for the data communication service for a User Equipment (UE), and responsively assign the UE to one or more of the independent wireless connections. The wireless communication devices detect a data communication loss on the assigned independent wireless connection(s), and responsively select one or more of the unassigned independent wireless connections and assign the UE to the selected unassigned independent wireless connections.

20 Claims, 7 Drawing Sheets

(51) Int. Cl.
*H04B 7/14* (2006.01)
*H04W 24/04* (2009.01)

(56) References Cited

U.S. PATENT DOCUMENTS

| | | |
|---|---|---|
| 7,889,637 B2 | 2/2011 | Bradbury et al. |
| 8,340,008 B2 | 12/2012 | Boyina et al. |
| 8,441,920 B2 | 5/2013 | Bradbury et al. |
| 8,873,419 B2 | 10/2014 | Soomro |
| 2003/0002513 A1 | 1/2003 | Bernheim et al. |
| 2005/0100029 A1* | 5/2005 | Das .................. H04L 45/22 370/401 |
| 2007/0021140 A1 | 1/2007 | Keyes et al. |
| 2010/0172284 A1* | 7/2010 | Horiuchi ............ H04B 7/15542 370/315 |
| 2010/0296390 A1* | 11/2010 | Boyina ................ H04W 24/04 370/216 |

* cited by examiner

CONNECTION DATABASE 500

| DEVICE | SERVICE | WIRELESS CONNECTION 1 | WIRELESS CONNECTION 2 | WIRELESS CONNECTION 3 |
|---|---|---|---|---|
| UE 1 | VIDEO CALL | CONNECTION A | CONNECTION B | CONNECTION C |
| UE 1 | MEDIA STREAMING | CONNECTION D | CONNECTION B | CONNECTION C |
| UE 1 | VOICE CALL | CONNECTION E | CONNECTION F | CONNECTION G |
| UE 2 | VIDEO CALL | CONNECTION A | CONNECTION B | CONNECTION H |
| UE 2 | INTERNET BROWSING | CONNECTION C | CONNECTION B | CONNECTION G |

WIRELESS COMMUNICATION SYSTEM TO IMPLEMENT INDEPENDENT WIRELESS CONNECTIONS

TECHNICAL BACKGROUND

User Equipment (UEs), such as mobile phones are used for services such as voice and video calling, Internet access and web browsing, media streaming, data messaging, E-mail, and the like. To receive these services, UEs connect to a wireless communication network. UEs attach to wireless access points to receive the wireless communication services of the wireless communication network. A UE receives the communication services over a wireless channel or connection. The wireless connection may be lost due to interference, network failure, or resource overload.

Network redundancy is a method that uses physically diverse connections and switching between connections upon connection failure events to protect against connection loss and provide uninterrupted service. Unlike, communication systems such as Synchronous Optical Networks (SONET) and Optical Transport Networks (OTN), which provide network redundancy, current wireless communication networks do not provide network redundancy using physically independent wireless channels. Therefore, if the wireless channel between the UE and the wireless access point is lost, then the UE must attempt to connect to the wireless communication network via another wireless connection. Rather than establishing another wireless connection upon failure of the existing wireless connection, it would be advantageous to have alternate wireless channels established and ready for switching upon connection failure.

OVERVIEW

Examples disclosed herein provide a system, method, hardware, and software to implement independent wireless connections for a data communication service. The method comprises configuring multiple wireless communication devices to establish the independent wireless connections with multiple wireless access points, and responsively monitoring the independent wireless connections. The method also includes receiving a request for the data communication service for a User Equipment (UE), and responsively assigning the UE to one or more of the independent wireless connections. The method further includes detecting a data communication loss on the assigned independent wireless connection(s), and responsively selecting one or more of the unassigned independent wireless connections and assigning the UE to the selected unassigned independent wireless connections.

In another example, a wireless communication system implements independent wireless connections for a data communication service. Multiple wireless communication devices establish the independent wireless connections with multiple wireless access points, and responsively monitor the independent wireless connections. The wireless communication devices receive a request for the data communication service for a User Equipment (UE), and responsively assign the UE to one or more of the independent wireless connections. The wireless communication devices detect a data communication loss on the assigned independent wireless connection(s), and responsively select one or more of the unassigned independent wireless connections and assign the UE to the selected unassigned independent wireless connections.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
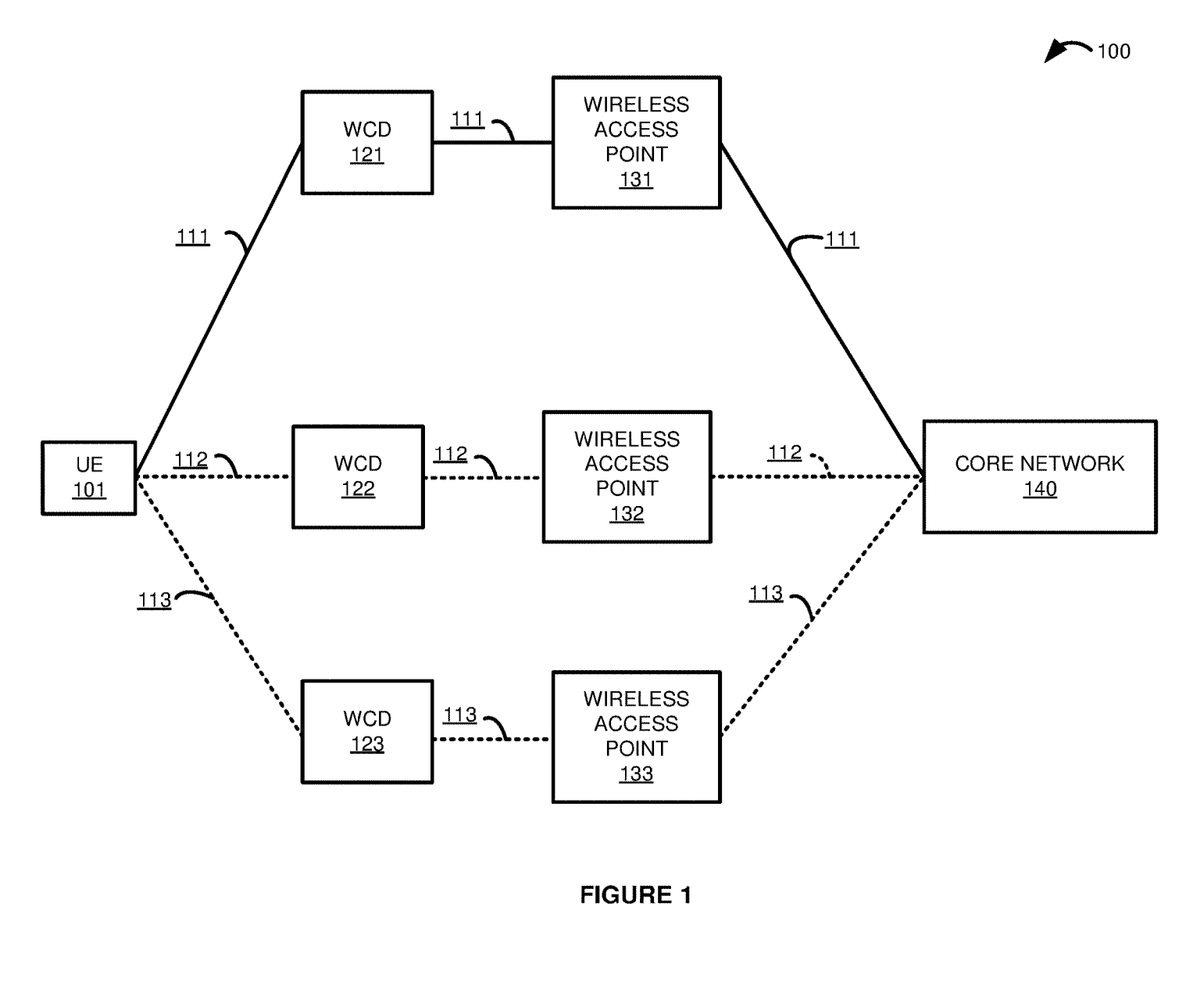
FIG. 1 illustrates a wireless communication system to implement independent wireless connections for a data service.

FIG. 1 illustrates wireless communication system 100 to implement independent wireless connections for a data service. Wireless communication system 100 includes User Equipment (UE) 101, wireless communication devices (WCDs) 121-123, wireless access points (WAPs) 131-133, core network 140, and communication links 111-113.

Communication link 111 provides communication between UE 101, WCD 121, WAP 131, and core network 140. Communication link 112 provides communication between UE 101, WCD 122, WAP 132, and core network 140. Communication link 113 provides communication between UE 101, WCD 123, WAP 133, and core network 140.

Communication links 111-113 may use any of a variety of communication media, such as air, metal, optical fiber, or any other signal propagation path, including combinations thereof. Also, the communication links may use any of a variety of communication protocols, such as Internet, telephony, optical networking, wireless communication, wireless fidelity (Wi-Fi), Long Term Evolution (LTE), code division multiple access (CDMA), worldwide interoperability for microwave access (Wi-MAX), or any other communication protocols and formats, including combinations thereof. Further, the links could be direct links or they might include various intermediate components, systems, and networks.

In operation, WCDs 121-123 are configured to establish independent wireless connections 111-113 with WAPs 131-133. WCDs 121-123 monitor independent wireless connections 111-113. For example, WCDs 121-123 may monitor network parameters such as signal strength and load. Although not required, wireless connections 111-113 between WCDs 121-123 and WAPs 131-133, respectively may be pre-existing or previously established data tunnels.

WCDs 121-123 receive a request for a data communication service for UE 101. In some examples, the device profile for UE 101 indicates that multiple independent wireless connections should be provided. In other examples, multiple independent wireless connections may be indicated in the request for the data communication service.

UE 101 may have two or more redundant wireless connections for each different requested data service. For example, if UE 101 requests two different data services, each with two independent wireless connections, there may be a total of six independent wireless connections for UE 101. In some examples, some of the wireless connections may be reused.

In FIG. 1, wireless connections 111-113 may be the redundant independent wireless connections for a media streaming service requested by UE 101. Although not required, independent wireless connections 111-113 may be to physically diverse WCDs. In some examples, the wireless connections are established upon request for a data service. In other examples, there may be a database that specifies independent wireless connections for each data service based on UE's location. In some examples, wireless connections 111-113 may be established, but unassigned. In addition, not all wireless connections 111-113 may be connected through to core network 140 until the wireless connections become assigned.

Examples of data communication services include voice calls, video calls, media streaming, and/or other data communication services. In response to the request, UE 101 is assigned to independent wireless connection 111, as indicated by the solid line. Independent wireless connections 112-113 are established, but unassigned, as indicated by the dotted lines. In some examples, UE 101 may be assigned to one or more independent wireless connections.

WCDs 121-123 detect a data communication loss on assigned independent wireless connection 111. In some examples, wireless connection 111 is lost due to a device failure of WCD 121. In other examples, wireless connection 111 is lost due to signal interference. In response to the failure of independent wireless connection 111, one or more of unassigned independent wireless connections 112-113 is selected. In some examples, the new wireless connection is selected based on signal strength. In other examples, the new wireless connection is selected based on load on the WCD. UE 101 is assigned to the selected ones of independent wireless connections 112-113.

WCDs 121-123 may comprise wireless relays, femto-cell base stations, and/or pico-cell base stations. WAPs may 131-133 comprise macro-cell base stations or LTE eNodeBs. Examples of UEs 101 include wireless communication devices such as a telephone, cellular phone, mobile phone, smartphone, Personal Digital Assistant (PDA), laptop, computer, e-book, eReader, mobile Internet appliance, fixed access point or some other wireless communication device with a wireless transceiver—including combinations thereof.

Figure 2:
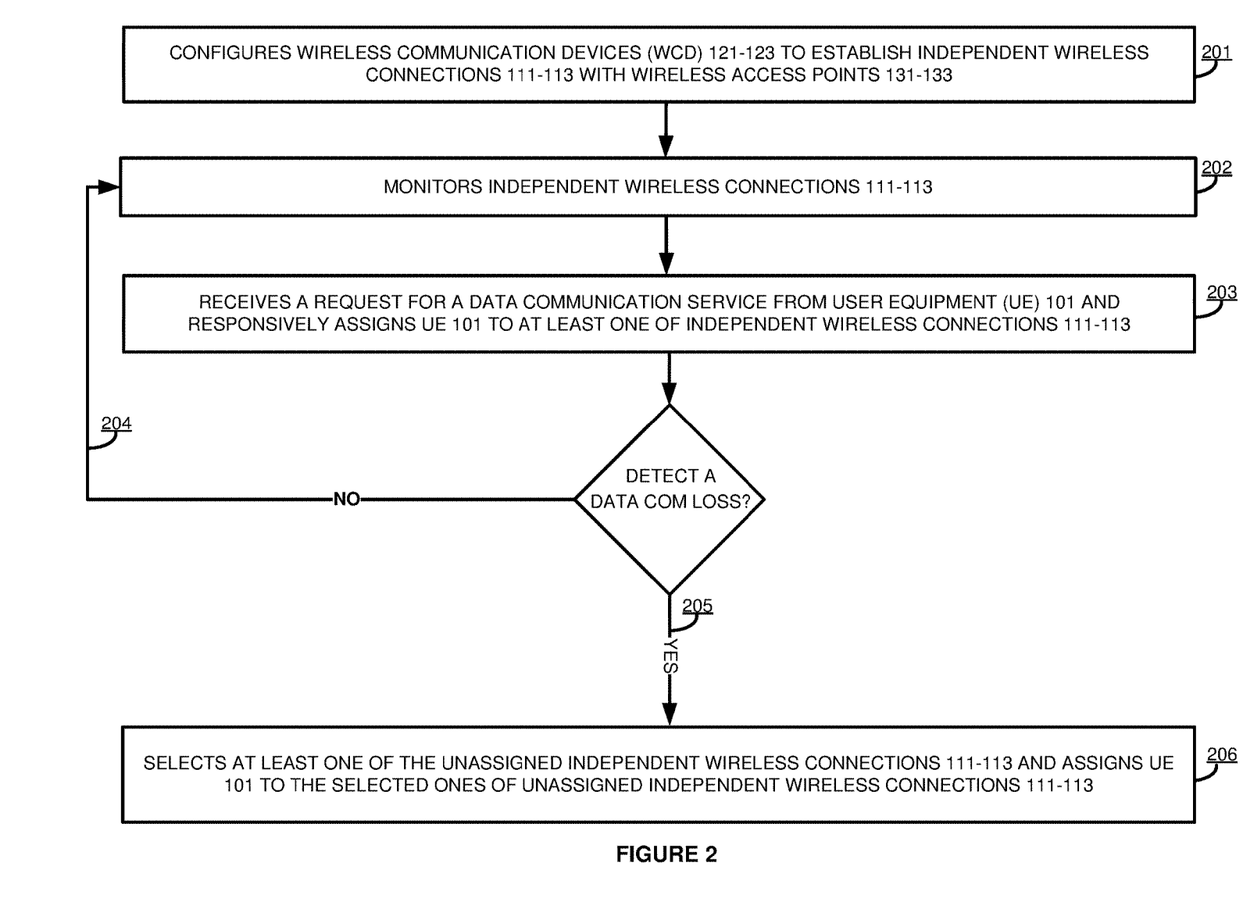
FIG. 2 illustrates the operation of the wireless communication system to implement the independent wireless connections for the data service.

FIG. 2 illustrates the operation of wireless communication system 100 to implement independent wireless connections. WCDs 121-123 establish independent wireless connections 111-113 with UE 101 (201). In some examples, wireless connections 111-113 between WCDs 121-123 and WAPs 131-133, respectively may comprise relay tunnels. In other examples, the connections between WCDs 121-123 and WAPs 131-133 mat comprise LTE-WLAN Aggregation (LWA) connections. WCDs 121-123 monitor independent wireless connections 111-113 (202).

WCDs 121-123 receive a request for a data communication service for UE 101, and responsively assign UE 101 to one or more of independent wireless connections 111-113 (203). Although not required, the request for the data communication service may indicate that multiple independent wireless connections should be established, this may be based on the requested data service or the UE profile.

In some examples, each independent wireless connection 111-113 is given a weight or score and UE 101 is assigned to the independent wireless connection with the highest weight or score. In other examples, the independent wireless connection may be selected based on average throughput or average Reference Signal Received Quality (RSRQ).

If WCDs 121-123 detect a data communication loss on the assigned independent wireless connection (205), then WCDs 121-123 responsively select one or more of the unassigned independent wireless connections, and assign UE 101 to the one or more selected unassigned independent wireless connections (206). In some examples, the data communication loss comprises loss data. In other examples, the data communication loss comprises incoherent data. The data communication loss may also be detected by UE 101 or WAPs 131-133. If WCDs 121-123 do not detect a data communication loss on the one or more assigned independent wireless connections (204), then WCDs 121-123 continue to monitor independent wireless connections 111-113 (202).

Figure 3:
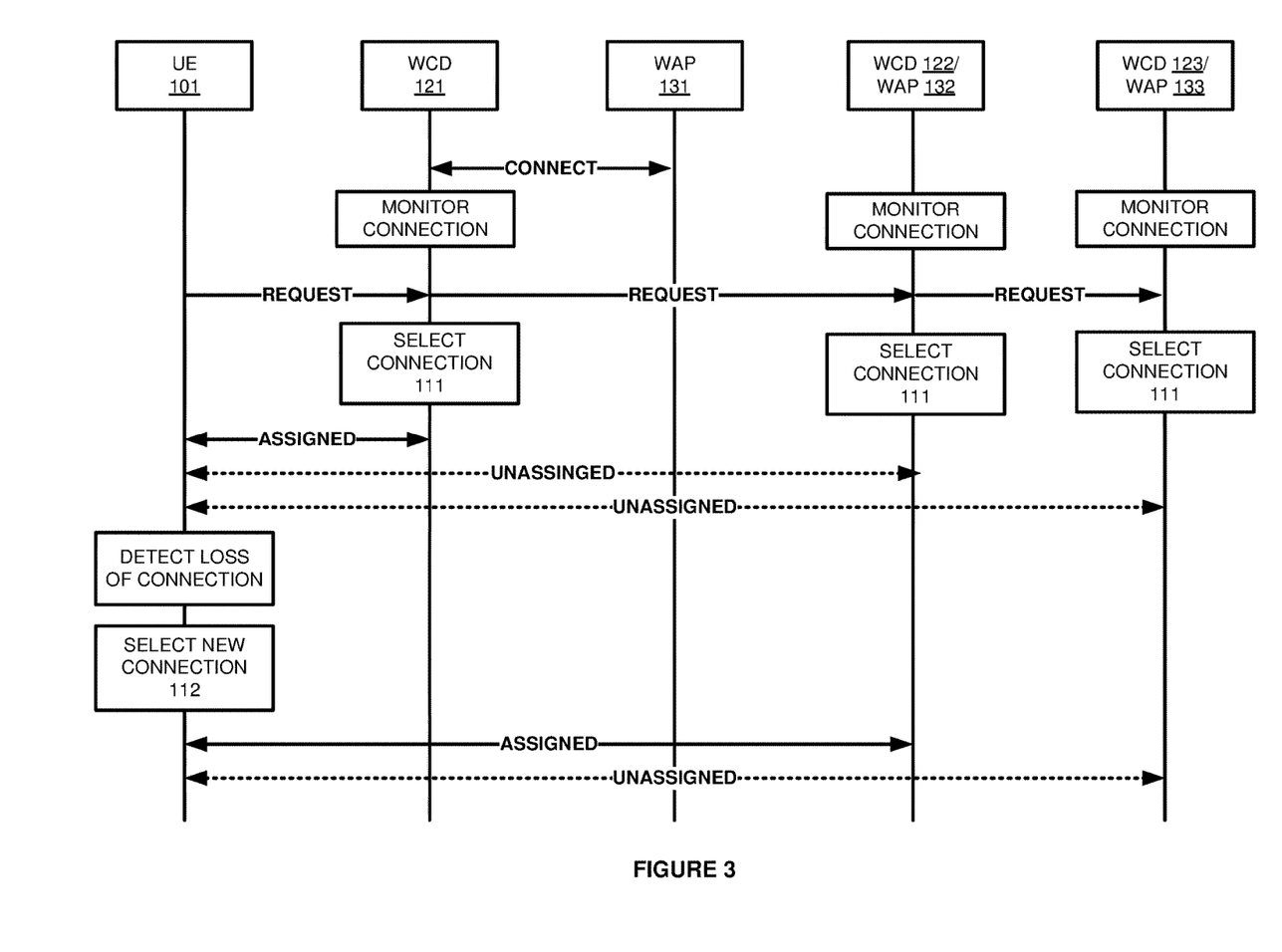
FIG. 3 illustrates the operation of the wireless communication system to implement the independent wireless connections for the data service

FIG. 3 illustrates the operation of the wireless communication system 100 to implement multiple independent wireless connections. WCD 121 establishes a connection with WAP 131. Although not shown for clarity, WCDs 122-123 similarly establish connections with WAPs 132-133, respectively. WCDs 121-123 monitor independent wireless connections 111-113.

WCDs 121-123 receive a request for a data communication service for UE 101. WCDs 121-123 select independent wireless connection 111 for the requested data communication service. WCDs assign UE 101 to independent wireless connection 111. In some examples, UE 101 may be assigned to more than one independent wireless connections. The additional connections may be used for data redundancy, additional capacity, or error correction. WCDs 121-123 detect a data communication loss on assigned independent wireless connection 111, and responsively select unassigned independent wireless connection 112 to assign to UE 101. Independent wireless connection 113 is established but unassigned.

Figure 4:
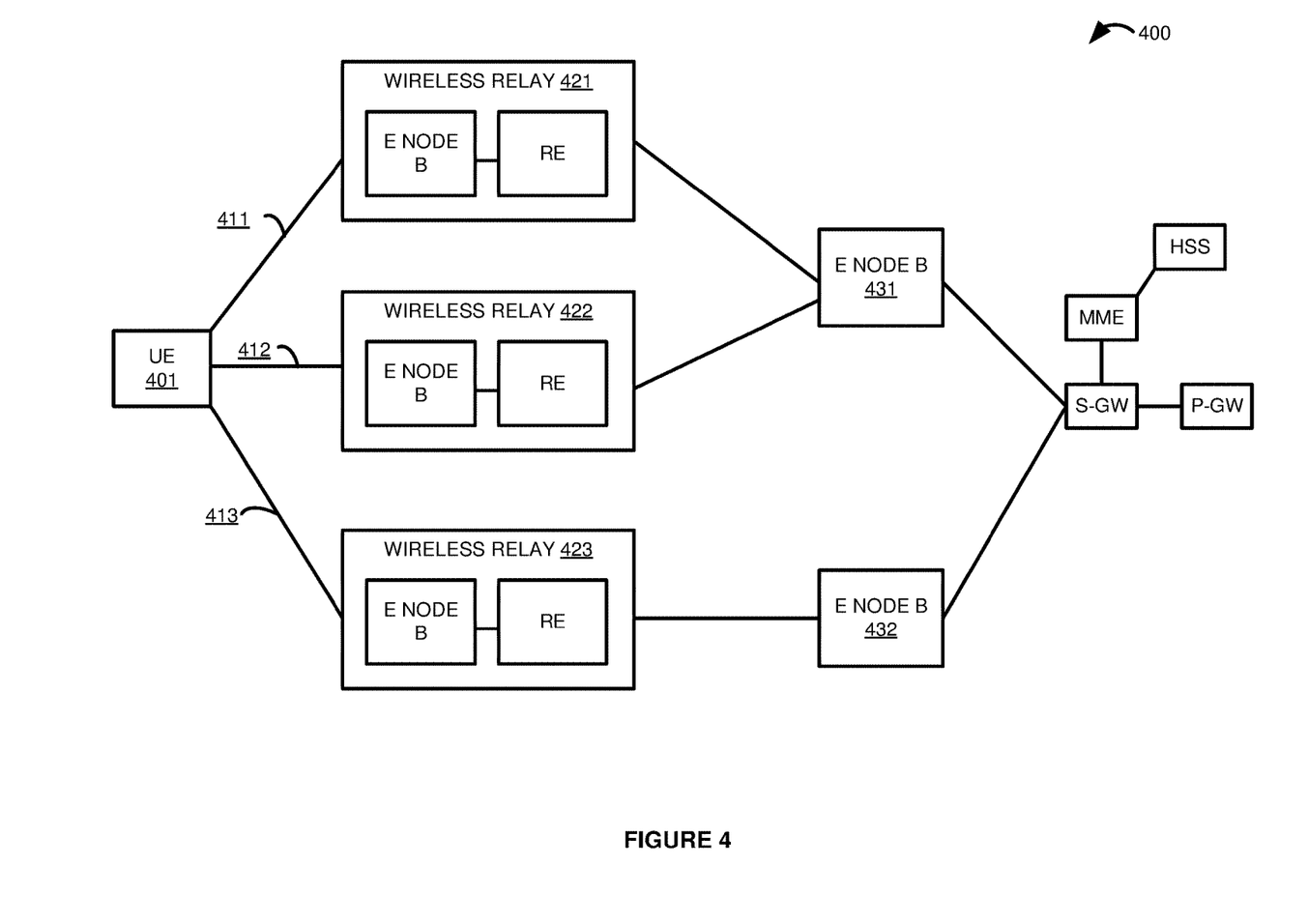
FIG. 4 illustrates a Long Term Evolution (LTE) communication system to implement independent wireless connections for a data service.

FIG. 4 illustrates LTE communication network 400 to implement independent wireless connections for a data service. LTE communication system 400 includes UE 401, independent wireless connections 411-413, wireless relays 421-423, eNodeBs 431-432, Serving Gateway (S-GW), Mobility Management Entity (MME), Home Subscriber Server (HSS), and Packet Data Network (PDN) Gateway (P-GW). FIG. 4 may include other components not shown for clarity.

Wireless relays 421-423 each include an eNodeB and a Relay UE (RE). UE 401 communicates with wireless relays 421-423 via the eNodeB in the wireless relays. Wireless relays 421-422 communicate with eNodeB 431 and wireless relay 423 communicates with eNodeB 432 via the RE. ENodeBs 431-432 communicate with the core network.

Wireless relays 421-422 are configured to establish independent wireless connections with eNodeB 431 and wireless relay 423 is configured to establish an independent wireless connection with eNodeB 432. Wireless relays 421-423 monitor the independent wireless connections.

Wireless relays 421-423 receive a request for a data communication service for UE 401. For example, user of UE 401 may be trying to make a video call. Wireless relays 421-423 assign UE 401 to one or more of the established independent wireless connections. In some examples, independent wireless connections 411-413 provide hitless switching. In other words, multiple independent wireless connections may be always on or assigned to UE 401. The multiple independent wireless connections may be used to transmit redundant data. In some examples, wireless relays 421-423 and eNodeBs 431-432 include controllers to manage the multiple independent wireless connections. The controllers monitor the network devices and independent wireless connections, and synchronize the redundant data.

In addition, a service selector may provide real-time monitoring and selects the best connection for the requested service. In some examples, the MME may select the best connection for the requested service. The multiple independent wireless connections create network redundancy that lowers switching time when a wireless connection is lost, improving connectivity and user experience.

Wireless relays 421-423 detect a data communication loss on the assigned independent wireless connection, and responsively select one or more of the unassigned independent wireless connections for UE 401, and assigns the selected one or more independent wireless connection to UE 401.

Figure 5:
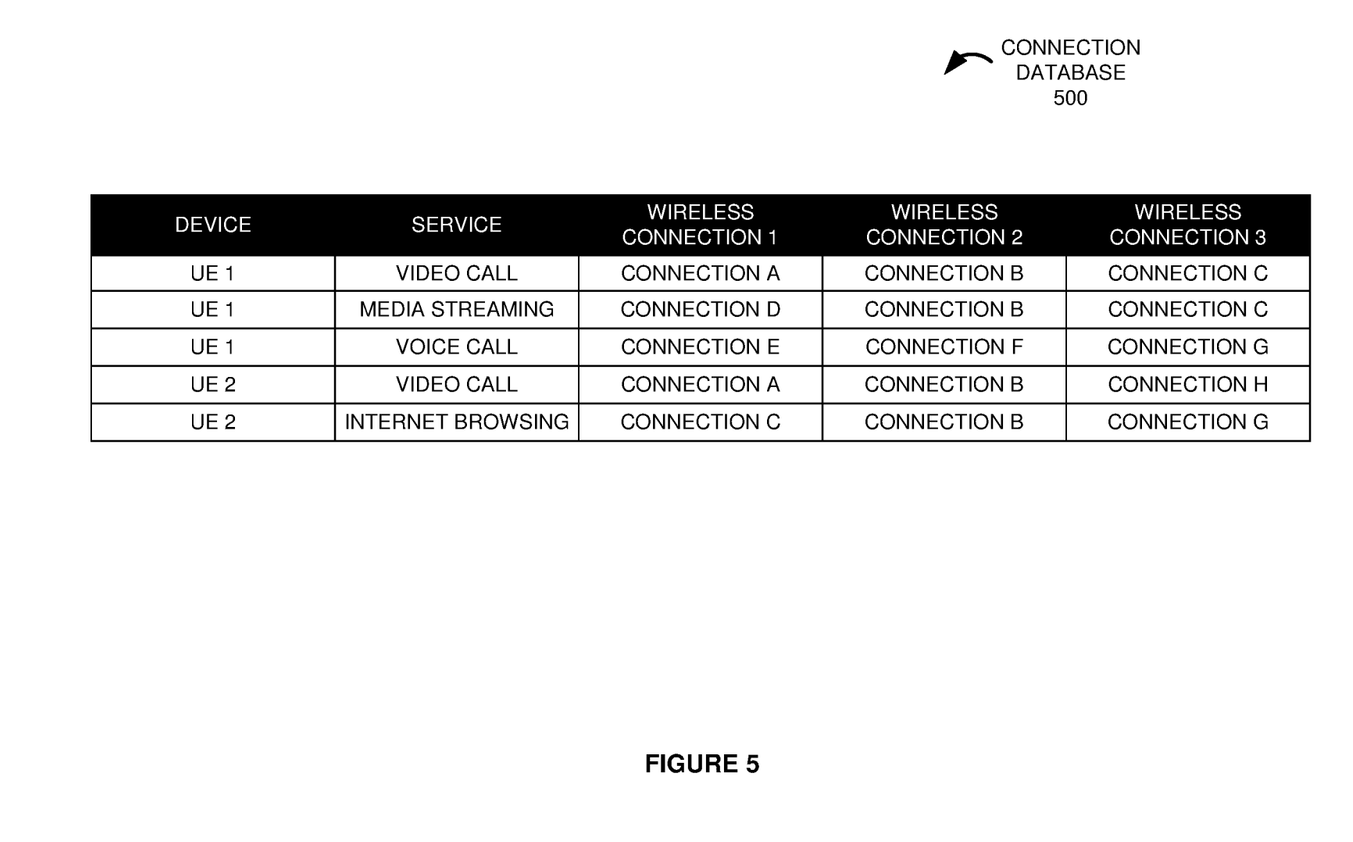
FIG. 5 illustrates a database to implement independent wireless connections for a data service.

FIG. 5 illustrates connection database 500 to implement multiple independent wireless connections. Connection database 500 includes columns device, service, and wireless connections 13. In some examples, the device column may be omitted. Connection database 500 may be used by the service selector or the MME to select the wireless connection for the requested service. The wireless connection may be further selected based on the requesting UE/device.

For example, if UE 1 requests a video call, connections A, B, and C would be established. In some examples, UE 1 would be assigned to connection A and connections B and C would be established but unassigned. In another example, if UE 1 requests media streaming, connections D, B, and C would be established. UE 1 may be assigned to connection D, connections B and C would be established, but unassigned.

Figure 6:
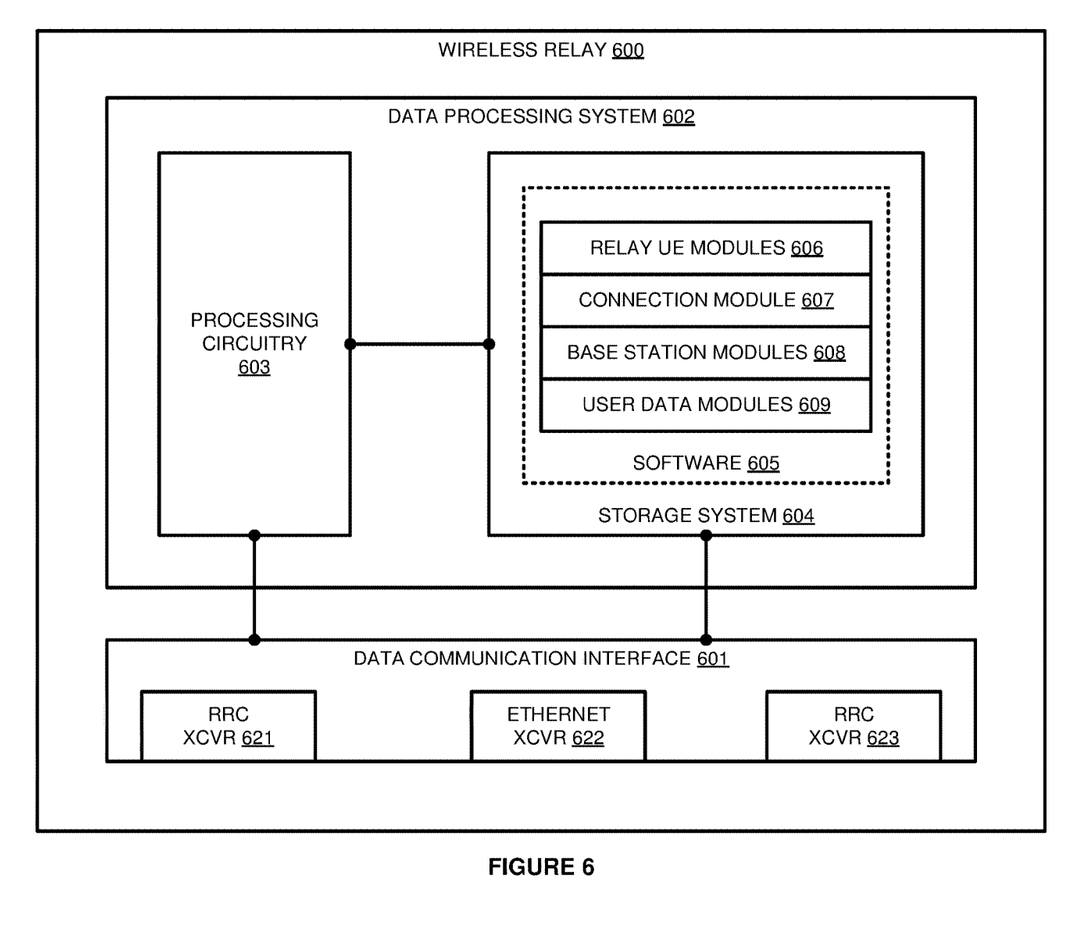
FIG. 6 illustrates a wireless relay to implement independent wireless connections for a data service.

FIG. 6 illustrates wireless relay 600 to implement independent wireless connections for a data communication service. Wireless relay 600 is an example of WCDs 121-123 and wireless relays 421-423. Although, these systems may use alternative configurations and operations. Wireless relay 600 comprises data communication interface 601 and data processing system 602. Data communication interface 601 comprises RRC transceiver 621, Ethernet transceiver 622, and RRC transceiver 623. Data processing system 602 comprises processing circuitry 603 and storage system 604. Storage system 604 stores software 605. Software 605 includes respective software modules 606-609.

Transceivers 621-623 comprise communication components, such as antennas, amplifiers, filters, modulators, ports, bus interfaces, digital signal processors, memory, software, and the like. Processing circuitry 603 comprises circuit boards, bus interfaces, integrated micro-processing circuitry, and associated electronics. Storage system 604 comprises non-transitory, machine-readable, data storage media, such as flash drives, disc drives, memory circuitry, data servers, and the like. Software 605 comprises machine-readable instructions that control the operation of processing circuitry 603 when executed. Wireless relay 600 may be centralized or distributed. All or portions of software 606-609 may be externally stored on one or more storage media, such as circuitry, discs, and the like. Some conventional aspects of wireless relay 600 are omitted for clarity, such as power supplies, enclosures, and the like.

When executed by processing circuitry 603, software modules 606-609 direct circuitry 603 to perform the following operations. Relay UE modules 606 direct RRC transceiver 623 to interact with donor eNodeBs. Relay UE modules 606 scan for donor eNodeBs. Connection module 607 directs processing system 602 to establish and monitor the independent wireless connections. Connection module 607 may also direct processing system 602 to select and assign the independent wireless connections. Base station modules 608 direct RRC transceiver 621 to interact with UEs. User data modules 609 exchange user data between transceivers 621-623.

Figure 7:
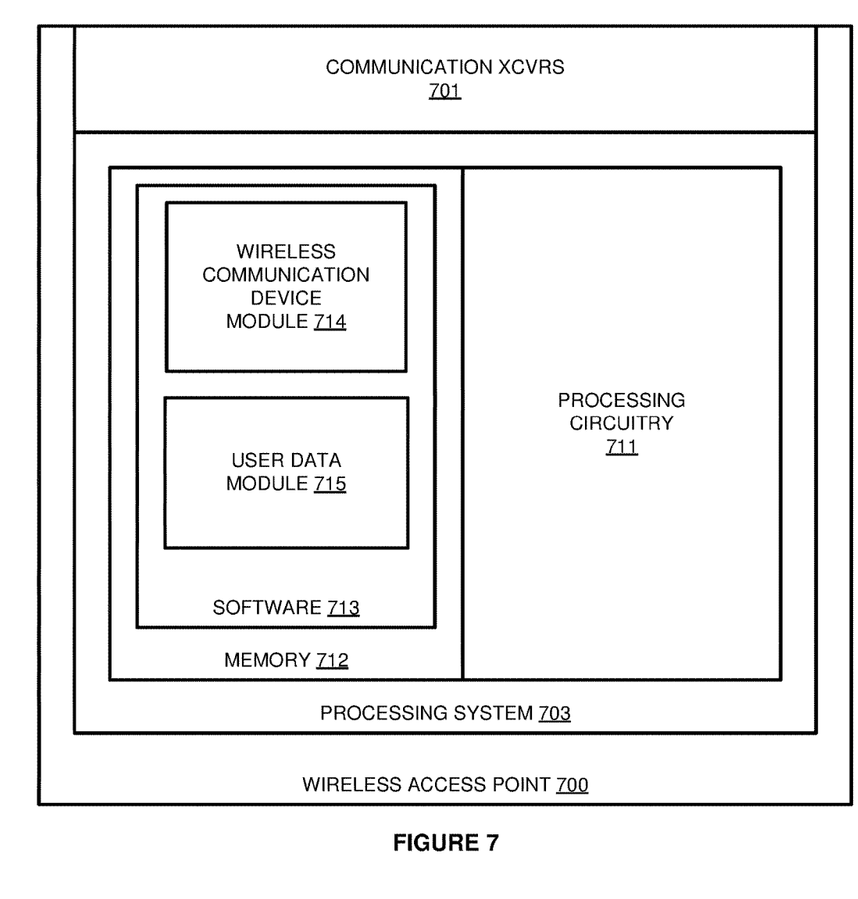
FIG. 7 illustrates a wireless access point to implement independent wireless connections for a data service

FIG. 7 illustrates wireless access point 700 to implement independent wireless connections for a data communication service. Wireless access point 700 is an example of WAPs 131-133 and WAPs 431-433. Although these systems may use alternative configurations and operations. Wireless access point 700 comprises communication transceiver system 701 and processing system 703. Processing system 703 includes processing circuitry 711 and memory 712 that stores software 713. Software 713 comprises software modules 714-715.

Communication transceiver systems 701 comprise components that communicate over communication links such as network cards, ports, RF transceivers, processing circuitry and software, or some other communication components. Communication transceiver systems 701 may be configured to communicate over metallic, wireless, or optical links. Communication transceiver systems 702 may be configured to use TDM, IP, Ethernet, optical networking, wireless protocols, communication signaling, or some other communication format—including combinations thereof. Communication transceiver system 702 user data and control signaling.

Processing circuitry 711 comprises microprocessor and other circuitry that retrieves and executes operating software 713 from memory 712. Processing circuitry 711 may comprise a single device or could be distributed across multiple devices—including devices in different geographic areas. Processing circuitry 711 may be embedded in various types of equipment. Examples of processing circuitry 711 include central processing units, application specific processors, logic devices, and/or any type of computer processing devices—including combinations thereof.

Memory 712 comprises a non-transitory computer readable storage medium readable by processing system 703 and capable of storing software 713, such as a disk drive, flash drive, data storage circuitry, or some other hardware memory apparatus—including combinations thereof. Memory 712 can include volatile and/or non-volatile, removable and non-removable media implemented in any method or technology for storage of information, such as computer readable instructions, data structures, program modules, or other data—including combinations thereof. Memory 712 may comprise a single device or could be distributed across multiple devices—including devices in different geographic areas. Memory 712 may be embedded in various types of equipment. In some examples, a computer apparatus could comprise memory 712 and software 713.

Software 713 comprises computer programs, firmware, or some other form of machine-readable processing instructions. Software 713 may include an operating system, utilities, drivers, network interfaces, applications, or some other type of software. In this example, software 713 comprises WCD module 714 and user data module 715. Although software 713 could have alternative configurations in other examples. Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703.

When executed, software 713 directs processing system 703 to operate as described herein to implement independent wireless connections. In particular, WCD module 714 directs processing system 703 to communicate with connected WCDs. User data module 715 directs processing system 703 to receive and transfer user data to UEs.

Referring back to FIG. 1, UE 101 comprises Radio Frequency (RF) communication circuitry and an antenna. The RF communication circuitry typically includes an amplifier, filter, modulator, and signal processing circuitry. UE 101 may also include a user interface, memory device, software, processing circuitry, or some other communication components. UE 101 may be a mobile device, mobile station, telephone, computer, e-book, mobile Internet appliance, fixed access point, wireless network interface card, media player, game console, or some other wireless communication apparatus—including combinations thereof.

WCDs 121-123 and WAPs 131-133 comprise RF communication circuitry and an antenna. The RF communication circuitry typically includes an amplifier, filter, RF modulator, and signal processing circuitry. WCDs 121-123 and WAPs 131-133 may also comprise a router, server, memory device, software, processing circuitry, cabling, power supply, network communication interface, structural support, or some other communication apparatus. WCDs 121-123 could be a wireless relay, WIFI hotspot, and/or another user device. WAPs 131-133 may be a base station, eNodeB, Internet access node, telephony service node, wireless data access point, and/or some other wireless communication system—including combinations thereof.

Communication links 111-113 could use metal, glass, air, space, or some other material as the transport media. Communication links 111-113 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), Time Division Multiplex (TDM), Internet Protocol (IP), Ethernet, communication signaling, or some other communication format—including combinations thereof. Communication links 111-113 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to implement independent wireless connections for data communication services comprising a voice call and a video call, the method comprising:
   receiving a request indicating one of the data communication services and a User Equipment (UE) Identifier (ID) for a UE indicating a media call and responsively selecting a number of unassigned independent wireless connections and assigned independent wireless connections for the UE based on the UE ID and the data communication service;
   configuring multiple wireless communication devices to use the assigned independent wireless connections and reserve the established number of unassigned independent wireless connections with multiple wireless access points and responsively monitoring the assigned independent wireless connections; and
   detecting a data communication loss on one or more of the assigned independent wireless connections and responsively selecting ones of the unassigned independent wireless connections and assigning the UE to the selected ones of the unassigned independent wireless connections.

2. The method of claim 1 wherein at least some of the multiple wireless communication devices comprise wireless relays.

3. The method of claim 2 wherein selecting the ones of the unassigned independent wireless connections comprises selecting the ones of the unassigned independent wireless connections based on the requested data communication service comprising one of the voice call and the video call.

4. The method of claim 2 wherein the wireless relays each comprise a wireless base station to serve user devices and Relay Equipment (RE) to communicate with the multiple wireless access points.

5. The method of claim 4 wherein selecting the ones of the unassigned independent wireless connections comprises selecting the ones of the unassigned independent wireless connections based on RE load.

6. The method of claim 4 wherein selecting the ones of the unassigned independent wireless connections comprises selecting the ones of the unassigned independent wireless connections based on RE signal strength from the multiple wireless access points.

7. The method of claim 4 wherein selecting the ones of the unassigned independent wireless connections comprises selecting the ones of the unassigned independent wireless connections based on RE signal strength to the multiple wireless access points.

8. The method of claim 3 further comprising, responsive to detecting the data communication loss, configuring at least some of the multiple wireless communication devices to establish additional independent wireless connections with at least some of the multiple wireless access points.

9. The method of claim 3 further comprising, responsive to detecting the data communication loss, configuring additional wireless communication devices to establish additional independent wireless connections with additional wireless access points.

10. The method of claim 2 wherein the wireless relays comprise Long Term Evolution (LTE) relays.

11. A wireless communication system to implement independent wireless connections for data communication services comprising a voice call and a video call, the method comprising:
  multiple wireless communication devices configured to receive a request indicating one of the data communication services and a User Equipment (UE) Identifier (ID) for a UE indicating a media call and responsively selecting a number of unassigned independent wireless connections and assigned independent wireless connections for the UE based on the UE ID and the data communication service;
  the multiple wireless communication devices configured to use the assigned independent wireless connections and reserve the established number of unassigned independent wireless connections with multiple wireless access points and responsively monitor the assigned independent wireless connections; and
  the multiple wireless communication devices configured to detect a data communication loss on one or more of the assigned independent wireless connections and responsively select ones of the unassigned independent wireless connections and assign the UE to the selected ones of the unassigned independent wireless connections.

12. The wireless communication system of claim 11 wherein at least some of the multiple wireless communication devices comprise wireless relays.

13. The wireless communication system of claim 12 wherein the multiple wireless communication devices are configured to select the ones of the unassigned independent wireless connections based on the requested data communication service comprising one of the voice call and the video call.

14. The wireless communication system of claim 12 wherein the wireless relays each comprise a wireless base station to serve user devices and Relay Equipment (RE) to communicate with the multiple wireless access points.

15. The wireless communication system of claim 14 wherein the multiple wireless communication devices are configured to select the ones of the unassigned independent wireless connections based on RE load.

16. The wireless communication system of claim 14 wherein the multiple wireless communication devices are configured to select the ones of the unassigned independent wireless connections based on RE signal strength from the multiple wireless access points.

17. The wireless communication system of claim 14 wherein the multiple wireless communication devices are configured to select the ones of the unassigned independent wireless connections based on RE signal strength to the multiple wireless access points.

18. The wireless communication system of claim 13 further comprising, responsive to detecting the data communication loss, at least some of the multiple wireless communication devices configured to establish additional independent wireless connections with at least some of the multiple wireless access points.

19. The wireless communication system of claim 13 further comprising, responsive to detecting the data communication loss, additional wireless communication devices configured to establish additional independent wireless connections with additional wireless access points.

20. The wireless communication system of claim 12 wherein the wireless relays comprise Long Term Evolution (LTE) relays.

* * * * *